(12) United States Patent
Dietrich et al.

(10) Patent No.: US 7,661,980 B2
(45) Date of Patent: Feb. 16, 2010

(54) CABLE CONNECTOR ASSEMBLY WITH WIRE TERMINATION GUIDE

(75) Inventors: David M. Dietrich, St. Peters, MO (US); Ron C. Defonce, High Ridge, MO (US); William A. Lamey, St. Peters, MO (US); William L. Mabrey, Crestwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/874,759

(22) Filed: Oct. 18, 2007

(65) Prior Publication Data

US 2009/0104822 A1    Apr. 23, 2009

(51) Int. Cl.
*H01R 13/58* (2006.01)
(52) U.S. Cl. .................................................. 439/460
(58) Field of Classification Search ................ 439/418, 439/676, 668, 460
See application file for complete search history.

(56) References Cited

U.S. PATENT DOCUMENTS

| | | | |
|---|---|---|---|
| 4,802,861 A | 2/1989 | Gaston | |
| 5,099,572 A | 3/1992 | Lazaro, Jr. et al. | |
| 6,124,663 A | 9/2000 | Haake et al. | |
| 6,280,232 B1 * | 8/2001 | Beecher et al. | 439/418 |
| 6,375,491 B1 * | 4/2002 | Durand et al. | 439/418 |
| 6,439,920 B1 * | 8/2002 | Chen | 439/418 |
| 6,506,077 B2 * | 1/2003 | Nagel | 439/608 |
| 6,793,401 B2 | 9/2004 | Daniel | |
| 6,837,738 B1 * | 1/2005 | Chen | 439/418 |
| 7,074,073 B2 | 7/2006 | Callahan et al. | |
| 7,241,173 B2 | 7/2007 | Callahan et al. | |
| 7,249,964 B1 | 7/2007 | Hoffman et al. | |
| 7,255,608 B2 | 8/2007 | Lalumandier et al. | |
| 7,374,450 B1 * | 5/2008 | Chang | 439/418 |
| 2006/0032047 A1 | 2/2006 | Johnson | |
| 2007/0025664 A1 | 2/2007 | Macaraeg | |
| 2007/0196052 A1 | 8/2007 | Weaver | |

* cited by examiner

*Primary Examiner*—Alexander Gilman
(74) *Attorney, Agent, or Firm*—Armstrong Teasdale LLP

(57) ABSTRACT

A cable connector assembly with a wire termination guide facilitating connection of multiple cable connectors to a plug-type connector in a reduced amount of time.

17 Claims, 5 Drawing Sheets

CABLE CONNECTOR ASSEMBLY WITH WIRE TERMINATION GUIDE

BACKGROUND OF THE DISCLOSURE

This disclosure relates generally to electrical connector assemblies, and more specifically to cable connector assemblies for cables having a plurality of conductor wires.

Military and commercial electronics often employ cabling or wiring harnesses for transmitting electrical or optical signals. Such cabling and wiring harnesses often have connections at a termination point that can be disconnected and reconnected through the use of electrical plugs such as connector assemblies. Many such connector assemblies have a male component and a female component that are joined together to complete one or more circuits. Typically the male connector includes one or more electrical or optical conductors, and the female connector includes one or more receptacles for receiving the conductors of the male connector portion.

Cables are known having a plurality of conductors, sometimes referred to as wires, so that many different optical or electrical signals can be conducted in the cable simultaneously. The cable conductors are typically terminated to a plug-type male connector on at least one end, and the plug-type connector is insertable into a female connector receptacle, sometimes referred to as a connector jack, that is in turn interfaced with an electronic device or signal transmission network. Attaching the plug-type connectors to such multi-cable cable conductors can be time consuming and difficult. For example, it has been found that plug-type connector can take approximately four hours to install to a cable having eight conductors. Especially when a number of such cables are utilized, such as in a complex signal transmission network of an aircraft having a number of interconnected operating systems, the time necessary to install all the cable connectors can result in significant time and labor costs.

BRIEF DESCRIPTION

Consistent with illustrative embodiments disclosed, a cable connector assembly is disclosed that greatly reduces the time and expense of connecting cable conductor wires to the cable connector.

In one embodiment, a cable connector assembly is disclosed. The assembly comprises a cable having a plurality of conductors with exposed ends; a connector shell having a plurality of electrical contacts; and a wire termination guide receiving the plurality of conductors, the wire termination guide being insertable into the conductor shell, thereby bringing each of the exposed ends of the plurality of conductors into electrical contact with a respective one of the plurality of contacts of the connector shell.

Optionally, the wire termination guide may include closed channel passages for receiving some of the conductors, and open channel passages for receiving other of the conductors. The open channel passages may be offset from the closed channel passages, and the open channel passages may have a varying depth along their axial length. The wire termination guide may be slidable into the connector shell, and may be insertable into the connector shell along an insertion axis. The wire termination guide may have a leading end, with the leading end being tapered along the insertion axis. The wire termination guide may include a body having a leading distal end insertable into the connector shell, a connector end opposing the leading end, and a notch provided between the distal end and the connector end, with the notch providing a clearance above the conductors when the wire termination guide in inserted into the connector shell. The connector shell may be configured to mate with an RJ-45 receptacle jack, and the cable may include eight conductors.

In another embodiment, a cable connector assembly includes: a cable having a plurality of conductors and an insulated jacket surrounding the conductors, a portion of the insulated jacket being removed to expose ends of the conductors; a connector shell defining an open-ended rectangular cavity and a plurality of electrical contacts therein; and a wire termination guide having a body configured to engage each end of the plurality of conductors as they are being inserted into the cavity and maintain alignment of the conductors with respect to the contacts, the wire termination guide being slidably insertable into the conductor shell with the conductors engaged, thereby substantially simultaneously bringing each of the plurality of conductors into electrical contact with a respective one of the plurality of contacts of the connector shell.

Optionally, the body of the wire termination guide may define a first group of channel passages to receive a first group of conductors, and the body of the wire termination guide may define a second group of channel passages to receive a second group of conductors, with the first group of channel passages being configured differently from the second group of channel passages. The first group of passages may be substantially aligned with one another, the second group of passages may be substantially aligned with one another, and the first group of passages may be misaligned with the second group of passages. The first group of passages may substantially surround each of the respective conductors of the first group. The second group of passages may define open cradles for the second group of conductors. The cradles may be formed in a first surface and a second surface of the body, with the first and second surfaces extending obliquely to one another. The wire termination guide may be insertable into the connector shell along an insertion axis, with the wire termination guide having a leading end and the leading end being tapered along the insertion axis. The body of the wire termination guide has a leading distal end insertable into the connector shell, a connector end facing the cable, and a notch extending transversely between the distal end and the connector end, with the notch providing a clearance above the conductors when the wire termination guide in inserted into the connector shell. The connector shell may be configured to mate with an RJ-45 receptacle jack. The cable may include eight conductors.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION

Exemplary embodiments of cable connector assemblies are disclosed herein that facilitate more or less simultaneous insertion of cable conductors for termination to a cable connector while ensuring the proper positioning and alignment of the conductor wires for termination to the contacts of the connector. This is achieved with the provision of a wire termination guide that avoids independent assembly and positioning of the cable conductor wires. Accordingly, time and labor costs to produce the cable connector assemblies is substantially reduced.

Terminating conductors of an electrical cable connector can sometimes be particularly challenging in certain installations, including but not limited to cabling and wiring systems of an aircraft. For example, in a four-pair twisted wire cable having eight signal conductors, terminating the cable conductors to an electrical connector for plug-in engagement with another electrical component is difficult. First, the insulation on the cable is stripped or removed at one end of the cable to expose the twisted wire pairs. Second, the twisted wire pairs must then be untwisted at their distal ends to provide, for example, eight individual leads for termination to the connector. Third, the leads must be inserted into and terminated to the connector.

Because the electrical connector may itself be quite small, a rather limited space to insert and terminate the wire leads may be provided. In one installation, the termination space for the connector is perhaps ¾ inches long and a fraction of an inch wide. Managing a plurality of different termination leads, such as eight termination leads, in such a small space is difficult and time intensive, and the proper alignment and orientation of the leads is key to successfully terminating the cable conductors to the connector. The termination leads tend to move relative to one another, however, as they are inserted and as the wires are terminated to the connector via, for example, a known soldering technique or other termination method. Aside from time and labor issues, the difficulty in terminating the leads may result in an unacceptably high failure rate when the cables and connectors are tested or reliability issues in use. Especially when a large number of cables and connectors are needed for relatively complicated signal transmission systems required by, for example, a modern aircraft, the assembly time and costs associated with cable termination to electrical connectors can be significant.

FIGS. 1-6 illustrate exemplary cable connector assemblies that greatly reduce, if not entirely avoid, these and other difficulties and facility reliable termination of cable conductors to electrical connectors in a reduced amount of time.

Figure 1:
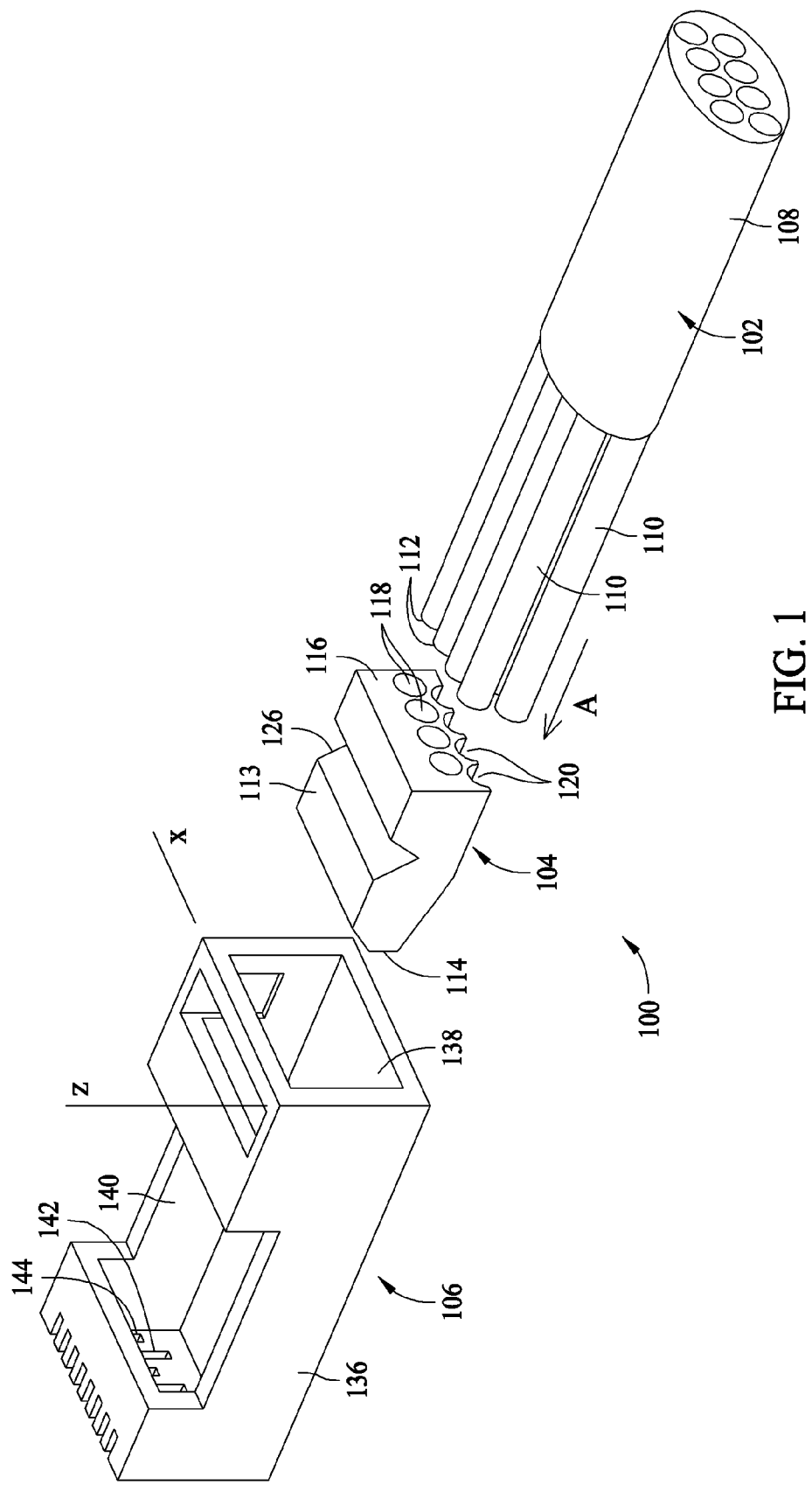
FIG. 1 is an exploded view of a cable connector assembly including an embodiment of a wire termination guide.

FIG. 1 is an exploded view of an exemplary cable connector assembly 100 including a cable 102, a wire termination guide 104, and a male or plug-type connector 106 that mates with a female or receptacle-type connector (not shown) that interfaces with an electronic device or a signal transmission network.

The cable 102 includes an insulation jacket 108 that surrounds a number of conductors 110, sometimes referred to as wires. As shown in FIG. 1, a portion of the jacket 108 has been removed to expose the distal ends 112 of the conductors 110 for termination to the connector 106. The conductors 110 transmit, for example, fiber optic or electrical signals from one location to another. Signals may be transmitted in signal pairs to avoid signal interference issues, and the cable may include grounding and shielding features known in the art to avoid or minimize external noise and detrimental effects in signals being transmitted. In the exemplary embodiment depicted, eight conductors 110 are provided that allow signal transmission of four signal pairs, although greater or lesser numbers of conductors may be included in other embodiments. Suitable cables 102 are commercially available from a variety of manufacturers and may be selected with particular performance parameters in mind.

The wire termination guide 104 is provided to greatly reduce difficulties in terminating the exposed ends 112 of the cable conductors 110 to the connector 106. The wire termination guide 104 may be fabricated from an insulative plastic material in one embodiment, and in the illustrated embodiment includes a body 113 having a leading end 114 and a connector end 116 opposing the leading end. The leading end 114 is tapered with inclined surfaces to guide the leading end 114 into the connector 114 along an insertion axis A that is generally parallel to the longitudinal axis of the cable conductors 110. The connector end 116 includes openings to passages 118 and 120 that individually receive one of the cable conductors 110. As shown in the Figures, four passages 118 are included and four passages 120 are included, such that there is one passage 118 or 120 for each of the eight conductors of the cable 102. It is appreciated, however, that greater or fewer numbers of passages 118 and 120 may be included in other embodiments to accommodate greater or fewer numbers of cable conductors.

Figure 2:
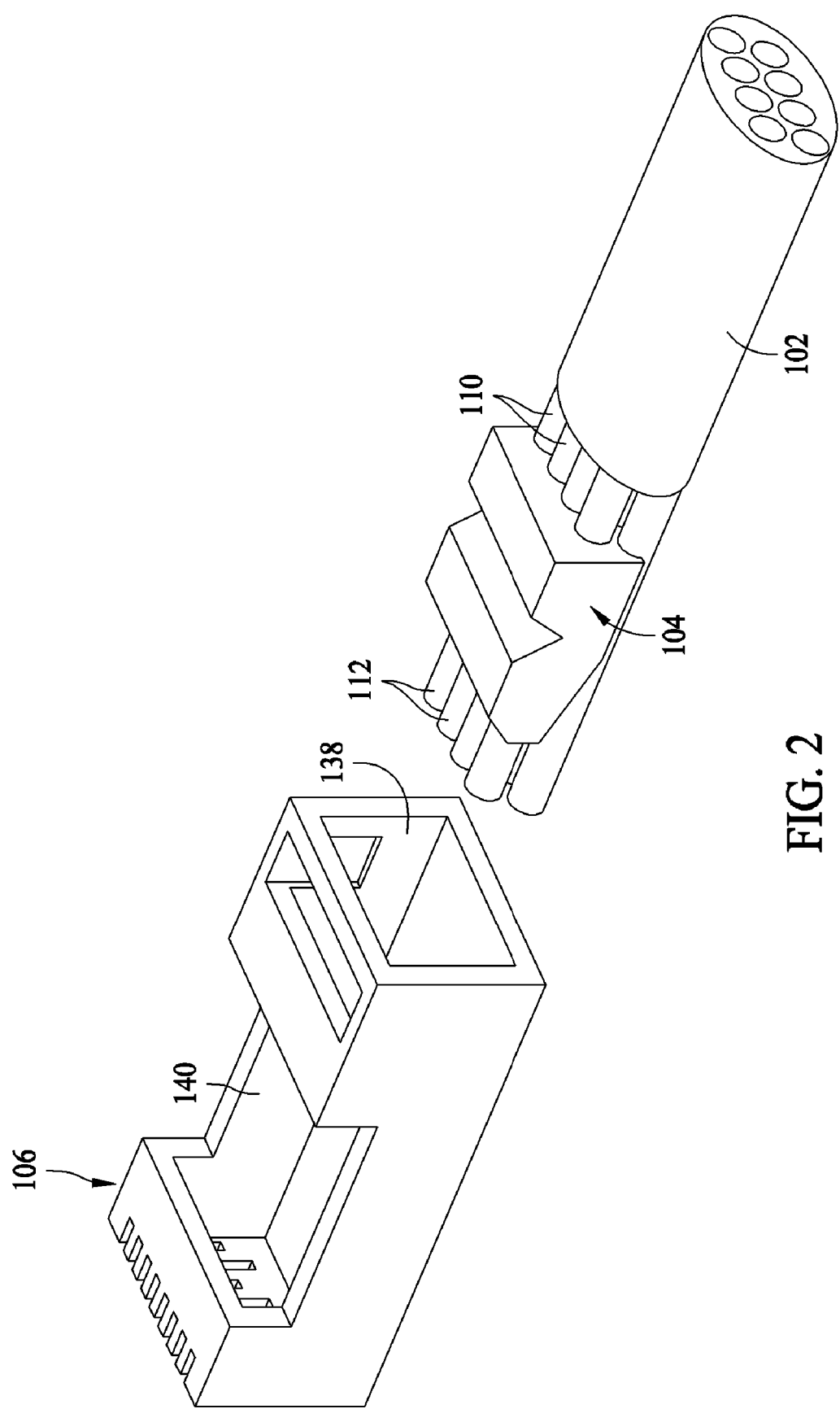
FIG. 2 illustrates the cable connector assembly at a first stage of manufacture.
Figure 5:
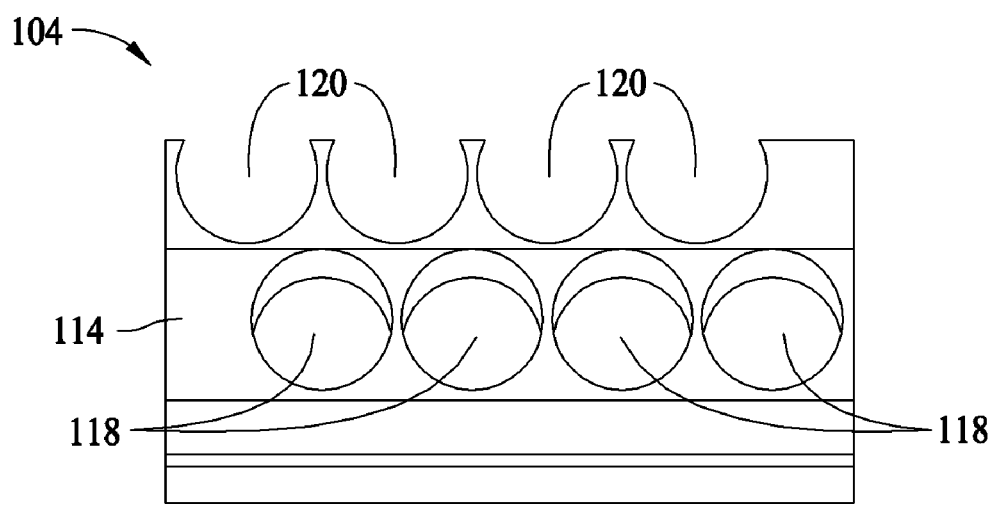
FIG. 5 is an end elevational view of the wire termination guide shown in FIG. 4.

The passages 118 may be, as shown in the figures, open ended bores that extend the entire length of the wire termination guide from the connector end 116 to the leading end 114. The bores of the passages 118 receive and surround the exposed ends 112 of some of the conductors 110 as best seen in FIG. 2. The passages 118 are generally aligned with one another in a row in the illustrative embodiment depicted in the Figures. As best seen in FIG. 5, the rows of passages 118, 120 in the wire termination guide 104 are offset from one another such that the passages 118 and 120 are laterally staggered or offset from one another. That is, the centerlines of the passages 118 and 120 are shifted to the side such that passages 118 are nested between passages 120.

The passages 120 may be, as shown in the figures, differently configured from the passages 118. In the exemplary embodiment shown, the passages 120 define open-faced cradles that, unlike the passages 118, do not surround the exposed ends 112 of some of the conductors 110. It is perhaps convenient to think of the passages 118 as being closed passages that completely surround the circumference of some of the conductors 110, and the passages 120 as being open passages that receive only a portion of the circumference of cable conductors 110 with the remaining of the circumference of the cable conductors 110 free. The open passages 120 simplify engagement of the wire termination guide 104 by avoiding a need to have to thread all the conductors 110 through the wire termination guide 104.

Figure 4:
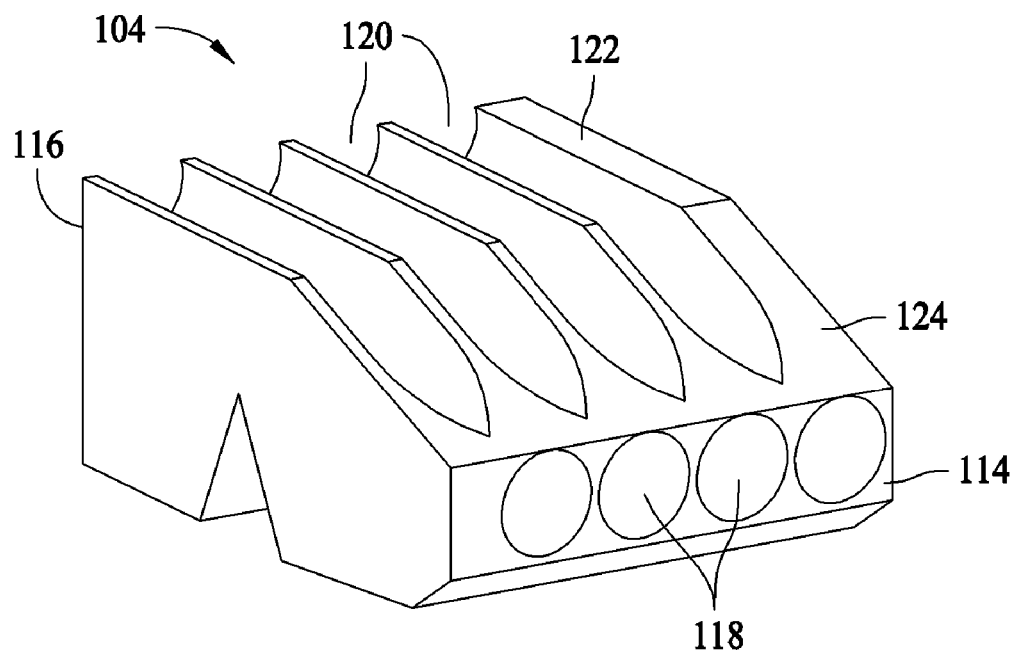
FIG. 4 is a perspective view of the wire termination guide shown in FIG. 4.

As best seen in FIG. 4, the open passages 120 may extend on a face of the body 113 having a first surface 122 and a second surface 124 that is inclined relative to the first surface 122. The open passages 120 extend longitudinally parallel to the first surface 122 but not the second surface 124, such that the open passages 120 are deeper at the connector end 116 and become shallower toward the leading end 114. Alternatively stated, the depth of the open channels 120 is not constant along the length of the open passages 120, and because of the sloped surface 124 extending to the leading end 114, the bottom portion of the open passages 120 eventually meet the sloped surface 124 proximate the leading end 114.

Figure 3:
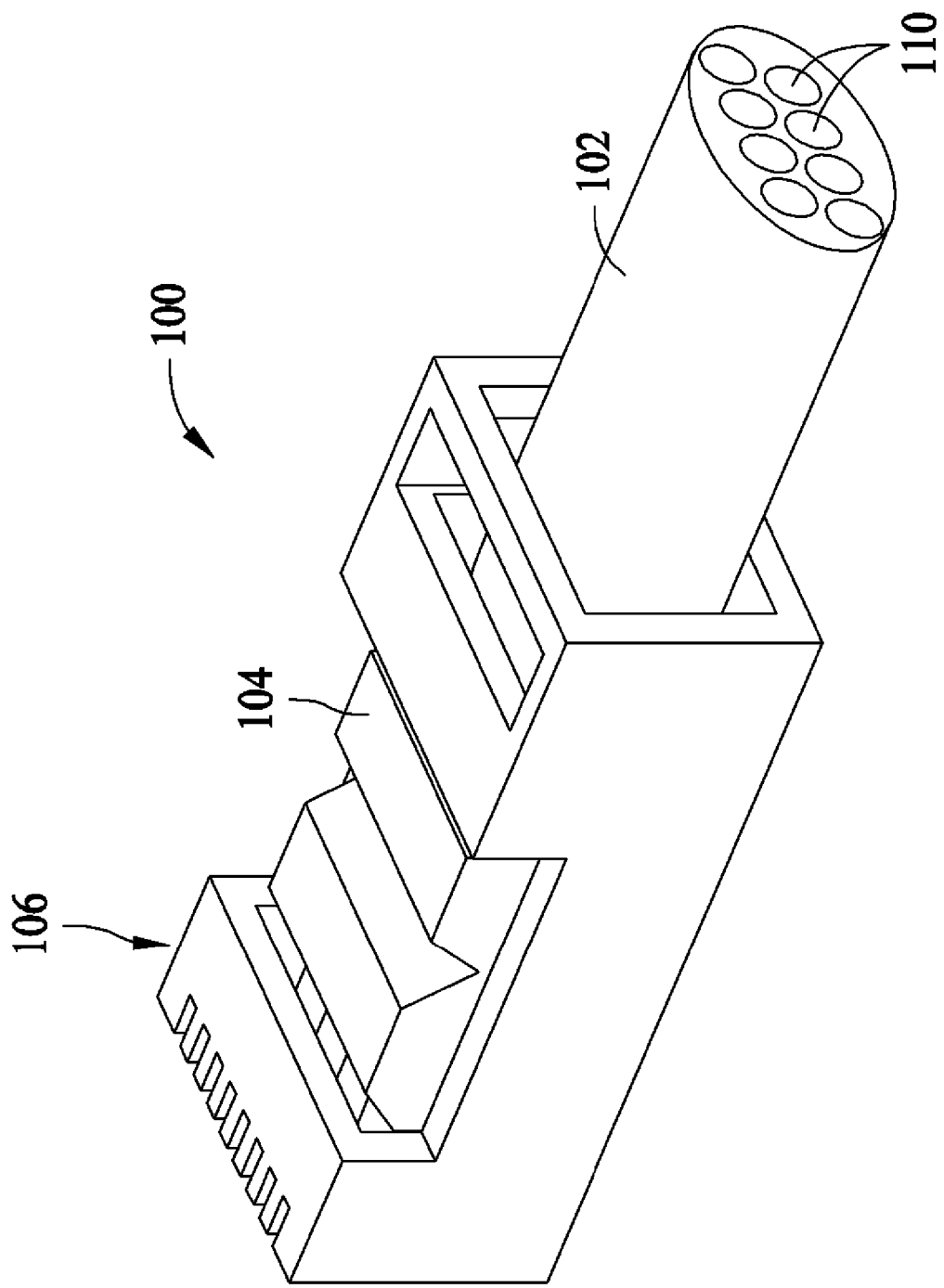
FIG. 3 illustrates that cable connector assembly at a second stage of manufacture.
Figure 6:
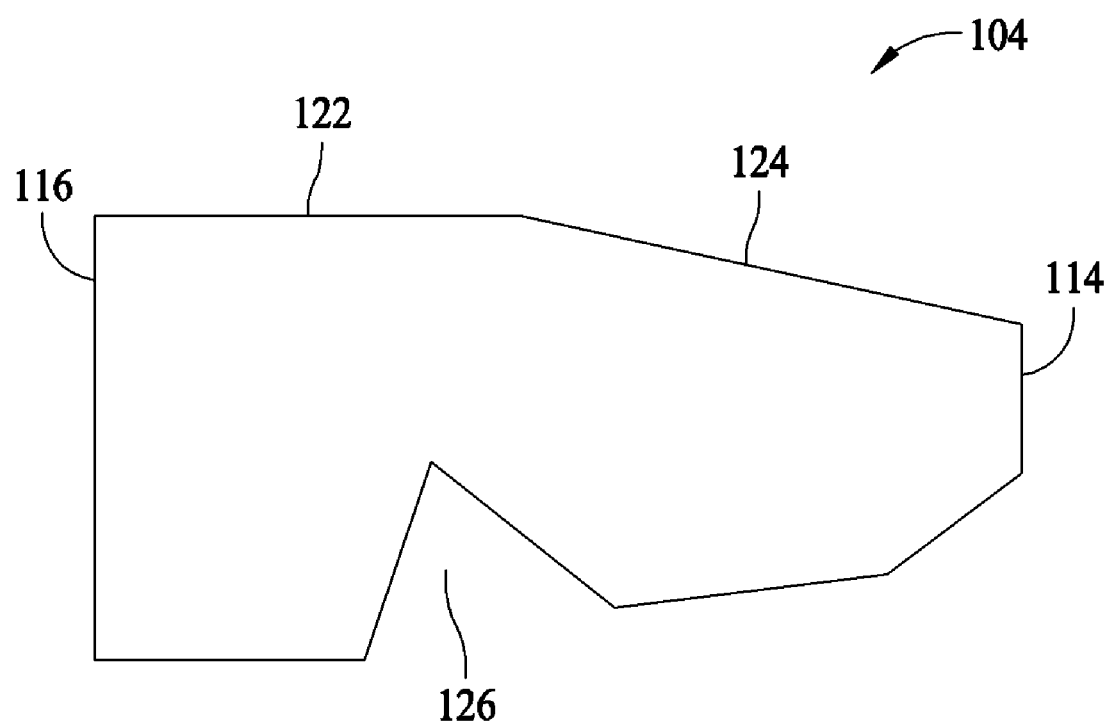
FIG. 6 is a side elevational view of the wire termination guide.

The body 113 of the wire termination guide 104 further includes a transverse notch 126, extending generally perpendicular to the insertion axis A, that is best seen in FIG. 6. In an exemplary embodiment the notch 126 extends in a V-shape and provides a clearance over the cable conductors 110 when the wire termination guide 104 is assembled to the connector 106 as shown in FIG. 3. The clearance allows for shielding, signal compensation, and/or latch features of the connector 106.

The connector 106 includes a generally rectangular shell 136 having a number of side walls in a box-like configuration having an open end 138. A compartment or cavity 140 is formed in the shell 136 and is accessible through the open end 138. The cavity 140 includes a number of electrical contacts 142 and 144 that are respectively to be attached to the signal conductors 110 of the cable 102. Connectors such as the connector 106 are generally known and may be recognized by those in the art as a modular connector sized, shaped and dimensioned to mate with a modular jack connector, such as, for example only, an RJ-45 receptacle jack. The connector 108 may include shielding and signal compensation features known in the art. Suitable connectors 106 are commercially available from a variety of manufacturers.

In use, the wire termination guide 104 may be engaged to the wire conductors 110 as shown in FIG. 2, with half of the conductors 110 passing through the closed passages 118 and half of the conductors 110 being received in the open passages 120. Once the conductors 110 are engaged to the wire termination guide 104, the wire termination guide 104 and the conductors 110 may be inserted into the open end 138 of the connector 106. The tapered leading end 114 of the wire termination guide 104 facilitates insertion of the wire termination guide 104 into the connector open end 138. Once inside the open end, the wire termination guide 104 and the conductors 110 is slidable further into the connector cavity 140 until the distal ends 112 of the conductors 110 are brought into electrical contact with the contacts 142 and 144 in the connector 106. The wire termination guide 104 maintains the conductor ends 112 in proper alignment with the connector contacts 142 and 144 as the wire termination guide is fitted within the connector 106, and the wire termination guide 104 is generally confined in the connector cavity 140.

Once the wire guide 104 is fully inserted into the connector 106, the conductor ends 112 may be terminated to the connector contacts 142 and 144 in a known manner, including but not limited to soldering techniques. After the conductor ends 112 are terminated to the connector 106, shielding or signal compensation components (not shown) may be installed to the connector 106 taking advantage of the clearance in the wire termination guide 104 by virtue of the notch 126. The assembly 100 is then ready for use, and by plugging the connector 106 into a receptacle jack, signal paths are completed through the cable conductors 110 and the connector contacts 142 and 144 to the connector jack. By virtue of the wire termination guide 104 that allows more or less simultaneous insertion of the cable conductors 110 to the connector 106 in a predetermined position, individual handling and termination of the conductors 110 is avoided. The connector 106 can be installed in about a half hour, as opposed to several hours or more using conventional techniques without such a guide.

Exemplary dimensions for the wire termination guide are shown in FIGS. 4-6, although the overall shape and dimensions of the wire termination guide 104 may vary from embodiment to embodiment. The wire termination guide 104 may be fabricated in bulk using an additive manufacturing process such as stereolithography, or by other techniques known in the art.

While cable connector assemblies have been described in terms of various specific embodiments, those skilled in the art will recognize that the embodiments can be practiced with modification within the spirit and scope of the claims.

What is claimed is:

1. A cable connector assembly comprising:
a cable having a plurality of conductors with exposed ends;
a connector shell having a plurality of electrical contacts; and
a wire termination guide receiving the plurality of conductors, the wire termination guide being insertable into the conductor shell, thereby bringing each of the exposed ends of the plurality of conductors into electrical contact with a respective one of the plurality of contacts of the connector shell;
wherein the wire termination guide is insertable into the connector shell along an insertion axis, the wire termination guide having a leading end, the leading end having a vertical substantially planar surface, said wire termination guide comprising a first surface extending at a first acute angle from a top end of said vertical surface, and a second surface extending at a second acute angle from a bottom end of said vertical surface, wherein said first acute angle is different than said second acute angle.

2. The cable connector assembly of claim 1, wherein the wire termination guide includes closed channel passages for receiving some of the conductors, and open channel passages for receiving other of the conductors.

3. The cable connector assembly of claim 2, wherein the open channel passages are offset from the closed channel passages.

4. The cable connector assembly of claim 2, wherein the open channel passages have a varying depth along their axial length.

5. The cable connector assembly of claim 1, wherein the wire termination guide is slidable into the connector shell.

6. The cable connector assembly of claim 1, wherein the wire termination guide includes a connector end opposing the leading end, and a notch provided between the distal end and the connector end, the notch providing a clearance above all of the conductors when the wire termination guide in inserted into the connector shell.

7. The cable connector assembly or claim 1, wherein the connector shell is configured to mate with an RJ-45 receptacle jack.

8. The cable connector assembly of claim 1, wherein the cable includes eight conductors.

9. A cable connector assembly comprising:
a cable having a plurality of conductors and an insulated jacket surrounding the conductors, a portion of the insulated jacket being removed to expose ends of the conductors;
a connector shell defining an open-ended rectangular cavity and a plurality of electrical contacts therein; and
a wire termination guide having a body configured to engage each end of the plurality of conductors as they are being inserted into the cavity and maintain alignment of the conductors with respect to the contacts, the wire termination guide being slidably insertable into the conductor shell with the conductors engaged, thereby substantially simultaneously bringing each of the plurality of conductors into electrical contact with a respective one of the plurality of contacts of the connector shell;
wherein the body of the wire termination guide has a leading distal end insertable into the connector shell, a connector end facing the cable, and a V-shaped notch extending transversely between the distal end and the connector end, the notch providing a clearance above all the conductors when the wire termination guide in inserted into the connector shell, wherein the leading distal end includes a vertical substantially planar surface, said wire termination guide comprising a first surface extending at a first acute angle from a top end of said vertical surface, and a second surface extending at a second acute angle from a bottom end of said vertical surface, wherein said first acute angle is different than said second acute angle.

10. The cable connector assembly of claim 9, wherein the body of the wire termination guide defines a first group of channel passages to receive a first group of conductors, and the body of the wire termination guide defines a second group of channel passages to receive a second group of conductors, the first group of channel passages being configured differently from the second group of channel passages.

11. The cable connector assembly of claim 10, wherein the first group of passages are substantially aligned with one another, the second group of passages are substantially aligned with one another, and the first group of passages being misaligned with the second group of passages.

12. The cable connector assembly of claim 10 wherein the first group of passages substantially surround each of the respective conductors of the first group.

13. The cable connector assembly of claim 10 wherein the second group of passages define open cradles for the second group of conductors.

14. The cable conductor assembly of claim 13, wherein the open cradles are formed in a first surface and a second surface of the body, the first and second surfaces extending obliquely to one another.

15. The cable connector assembly of claim 9, wherein the wire termination guide is insertable into the connector shell along an insertion axis, the leading end being tapered with opposing surfaces that are inclined relative to the insertion axis.

16. The cable connector assembly or claim 9, wherein the connector shell is configured to mate with an RJ-45 receptacle jack.

17. The cable connector assembly of claim 9, wherein the cable includes eight conductors.

* * * * *